United States Patent
Sung et al.

(10) Patent No.: US 7,945,268 B2
(45) Date of Patent: May 17, 2011

(54) APPARATUS AND METHOD FOR IDCELL ALLOCATION IN A BROADBAND WIRELESS COMMUNICATION SYSTEM

(75) Inventors: Ki-Won Sung, Seoul (KR);
Chae-Young Lee, Daejeon (KR);
Seung-Yong Ham, Seongnam-si (KR);
Ho-Dong Kim, Daejeon (KR);
Sang-Min Oh, Daejeon (KR)

(73) Assignees: Samsung Electronics Co., Ltd (KR);
Korea Advanced Institute of Science and Technology (KR)

( * ) Notice: Subject to any disclaimer, the term of this patent is extended or adjusted under 35 U.S.C. 154(b) by 829 days.

(21) Appl. No.: 11/871,686

(22) Filed: Oct. 12, 2007

(65) Prior Publication Data
US 2008/0090577 A1 Apr. 17, 2008

(30) Foreign Application Priority Data

Oct. 13, 2006 (KR) .................. 10-2006-0099841

(51) Int. Cl.
*H04Q 7/20* (2006.01)
(52) U.S. Cl. .................. 455/449; 455/446
(58) Field of Classification Search .................. None
See application file for complete search history.

(56) References Cited

U.S. PATENT DOCUMENTS

| 2005/0009528 A1 | 1/2005 | Iwamura et al. |
| 2006/0148408 A1 | 7/2006 | Cho et al. |
| 2007/0274253 A1* | 11/2007 | Zhang et al. .................. 370/328 |
| 2009/0129334 A1* | 5/2009 | Ma et al. ...................... 370/331 |

FOREIGN PATENT DOCUMENTS

| JP | 11-331931 | 11/1999 |
| JP | 2002-165275 | 6/2002 |
| JP | 2006-517762 | 7/2006 |
| JP | 2006-522503 | 9/2006 |

* cited by examiner

*Primary Examiner* — Phuoc Doan
(74) *Attorney, Agent, or Firm* — The Farrell Law Firm, P.C.

(57) ABSTRACT

An apparatus and a method for allocating IDcells in a wireless communication system are provided, in which an initial IDcell allocation is performed by allocating entire sectors to elements of an N×M IDcell matrix, a sector pair with the highest proximity is selected for each IDcell in the initial allocation, an IDcell with a sector pair having the highest of the proximities of the selected sector pairs is determined as a target IDcell, one sector of the sector pair with the highest proximity for the target IDcell is selected as a target sector, a predetermined number of sectors are selected for each of the other IDcells except for the target IDcell, from among sectors to which the each of the other IDcells is allocated, and the IDcell of the target sector is swapped with the IDcell of a sector satisfying a first condition among the selected sectors.

25 Claims, 7 Drawing Sheets

| IDCELL NUMBER | 0 | 1 | 2 | 3 | 4 | 5 | | 30 | 31 |
|---|---|---|---|---|---|---|---|---|---|
| ALLOCATION MATRIX | 1 | 7 | 12 | 31 | 4 | 54 | ... | | |
| | 8 | 9 | | 33 | 80 | 2 | | | |
| | 75 | 32 | | 43 | 13 | 62 | | | |
| | 16 | 17 | | 5 | | 20 | | | |

601

| WORST SECTOR PAIR MATRIX | 1 | 9 | | 31 | 4 | 2 | ... | | |
|---|---|---|---|---|---|---|---|---|---|
| | 16 | 32 | | 33 | 13 | 20 | | | |

TARGET IDCELL :1
→ TARGET SECTOR 9

| NEIGHBORHOOD MATRIX | 1 | ✗ | 12 | 31 | 4 | 2 | ... | | |
|---|---|---|---|---|---|---|---|---|---|
| | 8 | ✗ | | 5 | | 62 | | | |

| IDCELL NUMBER | 0 | 1 | 2 | 3 | 4 | 5 | ... | 30 | 31 |
|---|---|---|---|---|---|---|---|---|---|
| ALLOCATION MATRIX | 1 | 7 | 12 | 31 | 4 | 54 | | | |
| | 8 | 62 | | 33 | 80 | 2 | | | |
| | 75 | 32 | | 43 | 13 | 9 | | | |
| | 16 | 17 | | 5 | | 20 | | | |

| WORST SECTOR PAIR MATRIX | 1 | 7 | | 31 | 4 | 54 | ... | | |
|---|---|---|---|---|---|---|---|---|---|
| | 16 | 32 | | 33 | 13 | 2 | | | |

TARGET IDCELL : 3
→ TARGET SECTOR 33

| NEIGHBORHOOD MATRIX | 75 | 7 | | ✕ | 13 | 54 | ... | | |
|---|---|---|---|---|---|---|---|---|---|
| | 16 | 32 | | ✕ | | 9 | | | |

FIG.6B

APPARATUS AND METHOD FOR IDCELL ALLOCATION IN A BROADBAND WIRELESS COMMUNICATION SYSTEM

PRIORITY

This application claims priority under 35 U.S.C. §119(a) to a Korean Patent Application filed in the Korean Intellectual Property Office on Oct. 13, 2006 and assigned Serial No. 2006-0099841, the entire disclosure of which is hereby incorporated by reference.

BACKGROUND OF THE INVENTION

1. Field of the Invention

The present invention generally relates to IDcell allocation. More particularly, the present invention relates to an apparatus and method for allocating IDcells in a broadband wireless communication system.

2. Description of the Related Art

Institute of Electrical and Electronics Engineers (IEEE) 802.16e communication systems are basically cellular systems. Since the communications systems use a frequency reuse factor of 1, the same frequency can be used in adjacent cells. Therefore, a Mobile Station (MS) must be able to distinguish its serving sector from neighbor sectors among sectors using the same frequency. For this purpose, each sector transmits its specific Pseudo Noise (PN) code in the first symbol of every frame, referred to as a preamble.

The IEEE 802.16e standard defines 114 preamble PN codes in total, indexed from 0 to 113. Each preamble PN code carries an IDcell and a segment number. Hence, the MS can acquire the code index, IDcell, and segment number of the sector by interpreting the preamble PN code. The IDcell is a number from 0 to 31 and the segment number is 0, 1 or 2. This means that every code cannot have a unique (IDcell, segment number) combination. Only codes 0 to 95 have unique (IDcell, segment number) combinations and codes 96 to 113 reuse (IDcell, segment number) combinations.

IDcell serves a variety of purposes, especially for subcarrier randomization, which significantly affects system performance. During modulation, each sector performs subcarrier randomization using a Pseudo-Random Bit Sequence (PRBS). The initialization vector of a PRBS generator is designated 11 bits, b0 ... b10, such that <Downlink>
b0 ... b4=five Least Significant Bits (LSBs) of IDcell in the first Partial Usage of SubChannels (PUSC) zone or downlink PermBase.
b5 ... b6: PRBS_ID (segment number+1 in the first PUSC zone).
b7 ... b10: 0b1111 (all 1s).
<Uplink>
b0 ... b4=five LSBs of IDcell.
b5 ... b6: 0b11 (all 1s).
b7 ... b10: four LSBs of Frame Number.

For the downlink, the initialization vector is generated using an IDcell and a segment number in the first PUSC zone. For 32 IDcells and 3 segment numbers, 96 initialization vectors are created. For the uplink, the initialization vector is generated using an IDcell and a frame number. The number of initialization vectors varies with how a frame number is used. For instance, if frame numbers are not synchronized between sectors, up to 512 initialization vectors are generated, whereas if frame numbers are synchronized between sectors, 32 initialization vectors are generated. That is, the number of PRBSs that can be generated for the uplink is limited to 32.

Then, the probability that two or more adjacent sectors perform the same randomization becomes three times higher in the uplink than in the downlink. To avoid the same subcarrier randomization in adjacent sectors, the same IDcell is not allocated to the sectors, in the case of frame number synchronization, and the same (IDcell, segment) combination is not allocated to the sectors, in the case of frame number asynchronization.

The same subcarrier randomization between adjacent sectors leads to the same constellation mapping in the adjacent vectors. As the MS cannot identify a desired signal from interference, the MS faces a serious problem during demodulation, especially as the MS suffers from a great degradation of pilot estimation performance. Accordingly, it is preferred that adjacent sectors use different IDcells and there exists a need for a method for allocating IDcells so as to minimize the cases of using the same IDcell in sectors.

SUMMARY OF THE INVENTION

An aspect of the present invention is to address at least the problems and/or disadvantages and to provide at least the advantages described below. Accordingly, an aspect of the present invention is to provide an apparatus and method for IDcell allocation in a broadband wireless communication system.

In accordance with an aspect of the present invention, there is provided a method for allocating IDcells in a wireless communication system, in which an initial IDcell allocation is performed by allocating entire sectors to elements of an N×M IDcell matrix, a sector pair with a highest proximity is selected for each IDcell in the initial allocation, an IDcell with a sector pair having a highest proximity of the selected sector pairs is determined as a target IDcell, one sector of the sector pair with the highest proximity for the target IDcell is selected as a target sector, a predetermined number of sectors are selected for each of the other IDcells except for the target IDcell, from among sectors to which the each of the other IDcells is allocated, and the IDcell of the target sector is swapped with the IDcell of a sector satisfying a first condition among the selected sectors.

In accordance with another aspect of the present invention, there is provided an apparatus for allocating IDcells in a wireless communication system, in which an initial allocator performs an initial IDcell allocation by allocating entire sectors to elements of an N×M IDcell matrix, a target sector decider selects a sector pair with a highest proximity for each IDcell in the initial allocation, determines an IDcell with a sector pair having a highest proximity of the selected sector pairs as a target IDcell, and selects one sector of the sector pair with the highest proximity for the target IDcell as a target sector, a neighborhood set configurer forms a neighborhood set by selecting a predetermined number of sectors for each of the other IDcells except for the target IDcell from among sectors to which the each of the other IDcells is allocated, a best neighborhood decider determines a sector satisfying a first condition among the selected sectors as a best neighborhood, and a termination condition monitor swaps the IDcell of the target sector with the IDcell of the best neighborhood.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIGS. 6A and 6B illustrate an exemplary IDcell allocation algorithm in the broadband wireless communication system according to an embodiment of the present invention.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Embodiments of the present invention provide an apparatus and method for allocating IDcells in a broadband wireless communication system.

While IDcell allocation is described herein, it is a mere exemplary application. Therefore, the present invention is also applicable to allocation of other sector identification parameters, such as DL_PermBase and UL_PermBase.

To calculate the cost of using the same IDcell in adjacent sectors, an inter-sector proximity must be defined. Herein, the degree to which sector i interferes with sector j is defined as the proximity of sector i to sector j, denoted by Prox_ij. Prox_ij can be defined in many other ways. For example, if a network planning tool is used, Prox_ij can be the total amount of interference that sector j causes to sector i. If only information about the distance between the sectors is available, Prox_ij can be the path loss between sector i and sector j. More methods are available in defining Prox_ij. In accordance with an embodiment of the present invention, Prox_ij is determined in the apparatus illustrated in FIG. 1 by the method illustrated in FIG. 2.

Figure 1:
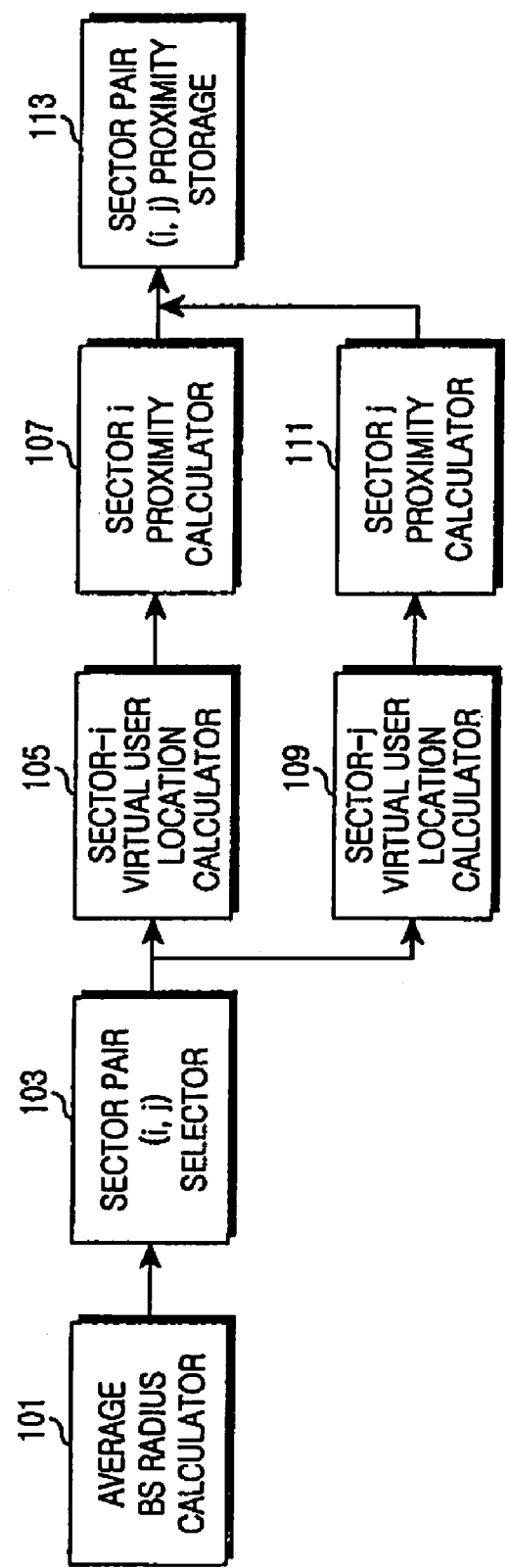
FIG. 1 is a block diagram of an apparatus for determining an inter-sector proximity in a broadband wireless communication system according to an embodiment of the present invention.

FIG. 1 is a block diagram of an apparatus for determining an inter-sector proximity in a broadband wireless communication system according to an embodiment of the present invention. The proximity determining apparatus includes an average Base Station (BS) radius calculator 101, a sector pair (i, j) selector 103, a sector-i virtual user location calculator 105, a sector i proximity calculator 107, a sector-j virtual user location calculator 109, a sector j proximity calculator 111, and a sector pair (i, j) proximity storage 113.

Referring to FIG. 1, the average BS radius calculator 101 calculates an average BS radius in the system. Let the distance between BS i and its closest BS be denoted by di. Then the average of the di values of all BSs in the system is defined as an average BS distance, and one-half of the average BS distance is defined as the average BS radius.

The sector pair (i, j) selector 103 randomly selects a sector pair (i, j) whose proximity is to be decided from among sector pairs and provides the average BS radius received from the average BS radius calculator 101 and the selected sector pair (i, j) to the sector-i virtual user location calculator 105 and the sector-j virtual user location calculator 109.

The sector-i virtual user location calculator 105 calculates the location of a virtual user representing sector i using the sector pair (i, j) and the average BS radius. It is assumed that the sector-i virtual user is positioned at a distance equal to one-half of the average BS radius on a line that an antenna of the sector points at its azimuth angle.

The sector i proximity calculator 107 calculates Prox_ij using the location of the sector-i virtual user. Prox_ij is determined to be the path loss between the location of the sector-i virtual user and the sector j, taking into account the antenna azimuth angle, the antenna pattern, and the transmit power of sector i.

The sector-j virtual user location calculator 109 calculates the location of a virtual user representing sector j using the sector pair (i, j) and the average BS radius. It is assumed that the sector-j virtual user is positioned at a distance equal to one-half of the average BS radius on a line that an antenna of the sector j points towards at its azimuth angle.

The sector j proximity calculator 111 calculates Prox_ji using the location of the sector-j virtual user. Prox_ji is determined to be the path loss between the location of the sector-j virtual user and the sector i, taking into account the antenna azimuth angle, the antenna pattern, and the transmit power of sector j.

The sector pair (i, j) proximity storage 113 sums the Prox_ij and the Prox_ji received from the sector i proximity calculator 107 and the sector j proximity calculator 111 as the proximity of the sector pair (i, j) and stores the proximity of the sector pair (i, j) for use in later IDcell allocation.

Figure 2:
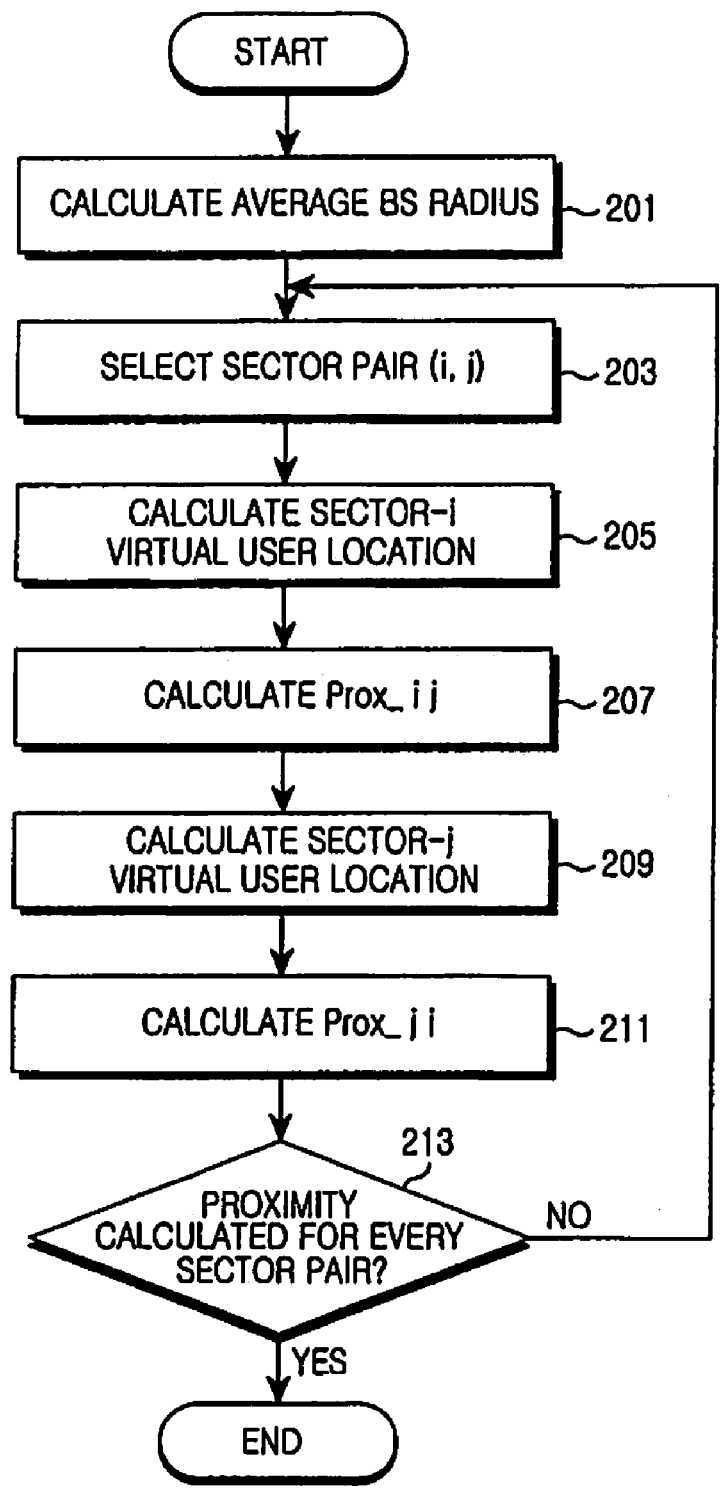
FIG. 2 is a flowchart of an operation for determining an inter-sector proximity in the broadband wireless communication system according to an embodiment of the present invention.

FIG. 2 is a flowchart of an operation for determining an inter-sector proximity in the broadband wireless communication system according to an embodiment of the present invention.

Referring to FIG. 2, the proximity determining apparatus calculates an average BS radius in the system in step 201. Let the distance between BS i and its closest BS be denoted by di. Then the average of the di values of all BSs in the system is defined as an average BS distance and one-half of the average BS distance is defined as the average BS radius.

In step 203, the proximity determining apparatus randomly selects a sector pair (i, j) whose proximity is to be decided from among sector pairs. The proximity determining apparatus calculates the location of a sector-i virtual user in step 205. It is assumed that the sector-i virtual user is positioned at a distance equal to one-half of the average BS radius on a line that an antenna of the sector i points at its azimuth angle. In step 207, the proximity determining apparatus calculates the proximity of sector i to sector j, Prox_ij using the location of the sector-i virtual user. Prox_ij is determined to be the path loss between the locations of the sector-i virtual user and the sector j, taking into account the antenna azimuth angle, antenna pattern, and transmit power of sector i.

The proximity determining apparatus calculates the location of a sector-j virtual user in the same manner as for sector i in step 209 and calculates the proximity of sector j to sector i, Prox_ji using the location of the sector-j virtual user in step 211. Prox_ji is determined to be the path loss between the location of the sector j virtual user and the sector i, taking into account the antenna azimuth angle, antenna pattern, and transmit power of sector j.

In step 213, the proximity determining apparatus determines whether the proximity of every sector pair in the system has been computed. If there remains any sector pair whose proximity is yet to be determined, the proximity determining apparatus returns to step 203. If the proximity has been determined over every sector pair, the proximity determining apparatus ends the algorithm.

Once the proximity of every sector pair within the system has been decided in the above manner, an IDcell is allocated to each sector. Since the degree of interference from sector i to sector j may be different from that of interference from sector j to sector i, the proximity of the sector pair is calculated by summing Prox_ij and Prox_ji.

Figure 5:
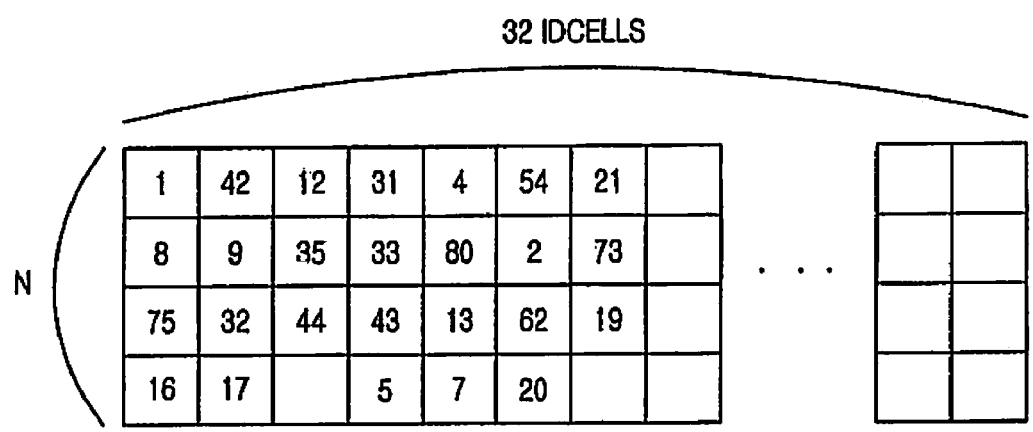
FIG. 5 illustrates an exemplary IDcell allocation status representation in the broadband wireless communication system according to an embodiment of the present invention.

A representation of an IDcell allocation status will be described with reference to FIG. 5. Referring to FIG. 5, IDcell allocation is performed by randomly allocating all sectors to the elements of an IDcell matrix with 32 columns and N rows. The columns represent 32 IDcells, respectively, and the N rows represent the maximum number of sectors to which the same IDcell can be allocated. 32 and N are design parameters. The number of the elements in the matrix, i.e. N×32 must be larger than the total number of sectors to which the IDcells are to be allocated. The same limitation applies, even when the N×32 matrix is replaced with a 32×N matrix. Each element of the matrix indicates the index of a sector to which an ID cell is allocated. It is assumed that every sector requiring ID cell allocation has its unique index and the indexes of sectors are not necessarily successive. For example, the value 75 of the element at a position (3, 1) in the matrix indicates that IDcell 0 is allocated to sector 75.

The above IDcell status representation has many advantages, one of which is to achieve solution diversification simply with one swap operation. In accordance with the embodiment of the present invention, swapping is employed as a method for improving IDcell allocation performance. Swapping is the process of exchanging one element in one column with one element in another column. Because the matrix has more elements than the entire sectors, some elements of the matrix are empty or filled with sector indexes. Therefore, swapping changes an already allocated IDcell to a different one for a sector, and if a selected element is empty, the swapping adds a new sector to an IDcell. As IDcells are allocated independently of each other, the IDcell allocation algorithm can be carried out on an IDcell-by-IDcell basis during ID cell allocation iterations, without the need for taking into account entire sectors using the same IDcells in the IDcell allocation status representation scheme.

The complexity of the IDcell allocation algorithm can be controlled using the design parameter N. As N increases, the maximum number of sectors to which the same IDcell can be allocated becomes larger. From the perspective of the algorithm, the design parameter N helps to perform more various solution searches. However, as N increases, the algorithm gets more complex. In this context, N needs to be optimally set. In accordance with the embodiment of the present invention, N is determined by Equation (1), which offers a good IDcell allocation performance while keeping the complexity at an appropriate level in the case where the matrix includes about 1.5 times more elements than the whole sectors.

$$N \geq \left\{ \frac{\text{number of sectors}}{32} \times \frac{3}{2} \right\} \quad (1)$$

The objective equation of IDcell allocation is given as Equation (2), which minimizes the maximum proximity of sector pairs using the same IDcell. As the closest sectors are placed apart from each other as far as possible, the performance of a sector pair expected to experience the greatest performance degradation is improved, that is, performance is ensured for the worst case.

$$\min\left[ \max_i (\text{prox\_i} w_i + \text{prox\_w}_i i) \right] \quad (2)$$

where $w_i$ denotes a sector with the highest proximity to sector i among sectors using the same IDcell with sector i, when frame numbers are synchronized, and denotes a sector with the highest proximity to sector i among sectors using the same (IDcell, segment number) combination with sector i, when frame numbers are not synchronized. In the latter case, it is assumed that the segment has been already allocated. For allocation of another sector identification parameter, DL_PermBase, $w_i$ denotes a sector with the highest proximity to sector i among sectors using the same DL_PermBase with sector i. For allocation of UL_PermBase, $w_i$ denotes a sector with the highest proximity to sector i among sectors using the same UL_PermBase with sector i. While the following description will focus on IDcell allocation in the case of frame number synchronization, it is clearly to be understood that the same description applies to other cases.

Meanwhile, for a swap operation, elements to be swapped must be selected. To do so, a target IDcell, a target sector, and a corresponding IDcell will first be defined. For each IDcell, the highest of the proximities of all possible sector pairs using the IDcell is defined as the lowest proximity for the IDcell. A target IDcell is an IDcell with the highest of the worst proximities of all IDcells. An IDcell must be changed for one sector of a sector pair with the lowest proximity under the target IDcell in order to decrease the lowest proximity. This one sector is defined as a target sector to be swapped. A corresponding IDcell is a counterpart of the target IDcell, under which elements in the matrix include an element to be swapped with the target sector. This element may include a sector index or may be empty.

The Tabu-list is made in order to avoid iterations of the same swapping in the present invention. The length of the Tabu-list is a design parameter, TABU_LENGTH. Each time of iteration, a target IDcell associated with the iteration is stored as a tabu in the Tabu_list. A new tabu is listed next to existing tabus in the Tabu_list. If the Tabu-List is filled up, the first-ranked Tabu is eliminated and a new Tabu is stored, thereby maintaining the length of the Tabu_list constant.

Figure 3:
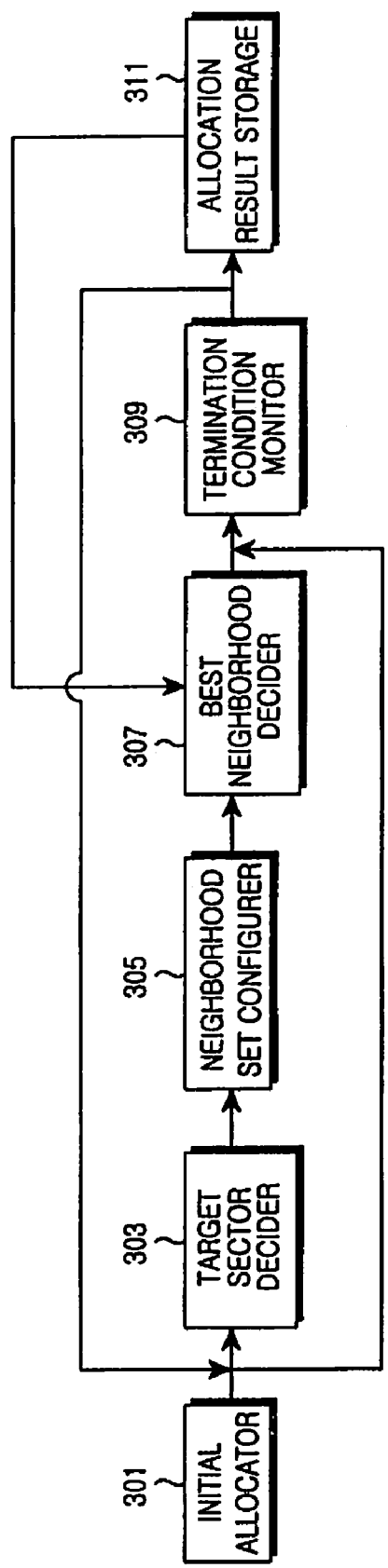
FIG. 3 is a block diagram of an IDcell allocation apparatus in the broadband wireless communication system according to an embodiment of the present invention.

FIG. 3 is a block diagram of an IDcell allocation apparatus in the broadband wireless communication system according to an embodiment of the present invention. The IDcell allocation apparatus includes an initial allocator 301, a target sector decider 303, a neighborhood set configurer 305, a best neighborhood decider 307, a termination condition monitor 309, and an allocation result storage 311.

Referring to FIG. 3, the initial allocator 301 initially allocates IDcells to sectors by randomly mapping the sectors to elements of an N×32 ID cell matrix.

The target sector decider 303 selects a sector pair having the lowest proximity for each IDcell based on the initial allocation result notified by the initial allocator 301 or a swapped allocation result notified by the termination condition monitor 309, and designates an IDcell for which a sector pair has the highest of the worst proximities as a target IDcell. The target sector decider 303 also randomly selects one sector from the sector pair with the lowest proximity for the target IDcell as a target sector.

The neighborhood set configurer 305 selects a predetermined number of elements (i.e. sectors) for all IDcells except for the target IDcell and forms a neighborhood set with the selected elements.

The best neighborhood decider 307 calculates a target $\Delta$ and a corresponding $\Delta$ that can be achieved over every sector of the neighborhood set by swapping with the target sector. The best neighborhood decider 307 detects a neighborhood set with sectors each having a target $\Delta$ less than 0 and a corresponding $\Delta$ less than or equal to 0 and selects a sector with the least target $\Delta$ that is not included in the Tabu_list from the neighborhood set as a best neighborhood. The corresponding IDcell is an IDcell for which there is an element swappable with the target sector. The target $\Delta$ is a variation resulting from the swapping-in of the lowest proximity of the target IDcell, and corresponding $\Delta$ is a variation resulting from the swapping in the lowest proximity of the corresponding IDcell. If the best neighborhood that satisfies the condition does not exist, the optimal neighbor decider 307 detects a neighborhood set with sectors each having the sum of the target $\Delta$ and the corresponding $\Delta$, which is less than or equal to 0, and selects a sector with the least sum that is not included in the Tabu_list from the neighborhood set as a best neighborhood. The best neighborhood decider 307 provides the target sector, the determined best neighborhood, and the ID cell received from the neighborhood set configurer 305 to the termination condition monitor 309.

The termination condition monitor 309 stores the initial allocation result as a good IDcell allocation in the allocation result storage 311 and initializes a best allocation. The termination condition monitor 309 then swaps the target sector with the decided best neighborhood, calculates the objective equation for the ID cell allocations before and after the swapping, compares the objective equation values, and updates the best allocation to the ID cell allocation with the smaller objective equation value. Here, the termination condition monitor 309 stores the target IDcell received from the initial allocator 301 in the Tabu_list. The termination condition monitor 309 provides the new IDcell allocation resulting from the swapping to the target sector decider 303 so that the above operation is repeated until the best allocation is kept unchanged a predetermined number of times. If the best allocation is kept unchanged a predetermined number of times, the objective equation values of the updated good allocation and the best allocation are compared and the best allocation is updated with the IDcell allocation with the smaller objective equation value. Thereafter, the termination condition monitor 309 determines the best allocation as a final IDcell allocation after a predetermined number of iterations of the operation.

The allocation result storage 311 stores the good allocation and the optimal allocation received from the terminal condition monitor 309. It also stores the target IDcell received from the termination condition monitor 309 and provides the stored Tabu-list to the best neighborhood decider 307 so that the best neighborhood decider 307 can refer to the Tabu-list in deciding a best neighborhood.

Figure 4:
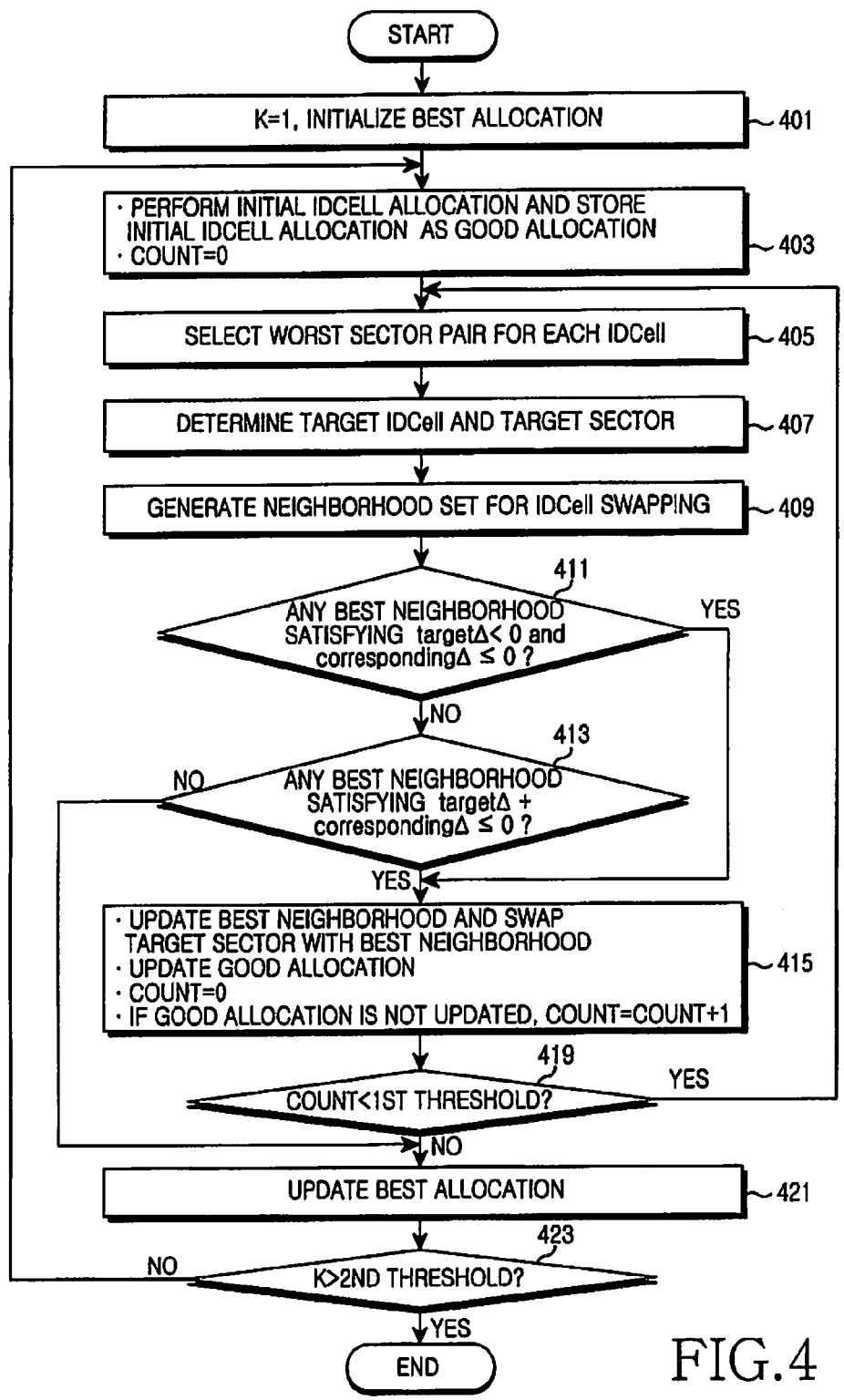
FIG. 4 is a flowchart of an IDcell allocation operation in the broadband wireless communication system according to an embodiment of the present invention.

FIG. 4 is a flowchart of an IDcell allocation operation in the broadband wireless communication system according to an embodiment of the present invention.

Referring to FIG. 4, the IDcell allocation apparatus sets an iteration number K to an initial value of 1 and initializes a best allocation to null in step 401.

In step 403, the IDcell allocation apparatus initially allocates IDcells to sectors using an N×32 IDcell allocation matrix, stores the initial allocation as a good allocation, and sets a count equal to the number of non-updates of the good allocation to an initial value of 0.

In step 405, the IDcell allocation apparatus selects a sector pair with the worst performance, i.e. a sector pair (i.e. a worst sector pair) with the lowest proximity for each IDcell and generates a 3×32 worst pair sector matrix having a worst sector pair and its proximity (i.e. lowest proximity) for each IDcell in each column.

The IDcell allocation apparatus selects an IDcell for which a worst sector pair has the highest proximity from among the worst sector pair matrix and designates the selected IDcell as a target IDcell in step 407. Also, the IDcell allocation apparatus randomly selects one of the sectors of the worst sector pair for the target IDcell and designates the selected sector as a target sector.

In step 409, the IDcell allocation apparatus selects a predetermined number of elements (i.e. sectors) for all IDcells except for the target IDcell, forms a neighborhood set with the selected elements, and generates a neighborhood matrix with the neighborhood set. In accordance with the embodiment of the present invention, N/2 elements are selected for each IDcell.

In step 411, the IDcell allocation apparatus calculates target $\Delta$ and corresponding $\Delta$ of the target sector over every element of the neighborhood set, which can be achieved by swapping. The IDcell allocation apparatus detects a neighborhood set satisfying the condition that target $\Delta$ is less than 0 and corresponding $\Delta$ is less than or equal to 0 as described in Equation (3) and determines whether there is a best neighborhood not included in the Tabu-list. Target $\Delta$ indicates a change in the lowest proximity of the target IDcell by the swapping and corresponding $\Delta$ indicates a change in the proximity of the corresponding IDcell by the swapping.

$$\text{target}\Delta<0 \ \& \ \text{corresponding}\Delta\leq 0 \tag{3}$$

In the presence of a best neighborhood satisfying Equation (3), the IDcell allocation apparatus stores the best neighborhood, that is a neighborhood with the least target $\Delta$ and swaps the target sector with the best neighborhood in step 415. Also, the IDcell allocation apparatus calculates the objective equation of the post-swapping allocation and compares the objective equation values of the post-swapping allocation and the good allocation. If the post-swapping allocation outperforms the good allocation, that is, if the post-swapping allocation has a less objective equation value than the good allocation, the good allocation is updated to the post-swapping allocation and the count is initialized to 0 and goes to step 419. If the post-swapping allocation does not outperform the good allocation, the IDcell allocation apparatus increases the count by 1 without updating the good allocation and proceeds to step 419.

On the other hand, in the absence of a best neighborhood satisfying Equation (3) in step 411, the IDcell allocation apparatus detects a neighborhood set satisfying the condition that the sum of target $\Delta$ and corresponding $\Delta$ is less than or equal to 0 and determines whether there is a best neighborhood not included in the Tabu-list in step 413. The Tabu-list can be identical to or different from the Tabu-list used in step 411.

The condition that the sum of target Δ and corresponding Δ is less than or equal to 0 is expressed as Equation (4).

$$\text{target}\Delta + \text{corresponding}\Delta \leq 0 \quad (4)$$

In the presence of a best neighborhood satisfying Equation (4), the IDcell allocation apparatus performs step 415. In the absence of a best neighborhood satisfying Equation (4) in step 413, the IDcell allocation apparatus jumps to step 421.

In step 419, the IDcell allocation apparatus compares the count with a first threshold. If the count is less than the first threshold, the IDcell allocation apparatus updates the columns corresponding to the target IDcell and the corresponding IDcell in the matrix according to the post-swapping allocation and returns to step 405. If the count is greater than or equal to the first threshold, the IDcell allocation apparatus compares the objective allocation values of the best allocation and the updated good allocation in step 421. If the updated good allocation has a less objective equation value than the best allocation, the best allocation is updated to the good allocation.

In step 423, the IDcell allocation apparatus compares K with a second threshold. If K is less than or equal to the second threshold, the IDcell allocation apparatus increases K by 1 in step 425 and returns to step 403. If K is larger than the second threshold, the IDcell allocation apparatus determines the best allocation as a final IDcell allocation and ends the algorithm of the present invention.

FIGS. 6A and 6B illustrate an exemplary IDcell allocation algorithm in the broadband wireless communication system according to an embodiment of the present invention. In the illustrated case of FIGS. 6A and 6B, an IDcell allocation algorithm is performed to allocate IDcells to 90 sectors. Since $N \geq 4$ according to Equation (1), a 4×32 IDcell matrix is formed for IDcell allocation.

Referring to FIGS. 6A and 6B, the IDcell allocation apparatus generates a worst sector pair matrix with a worst sector pair for each IDcell using an initial allocation matrix illustrated in FIG. 6A. A worst sector pair (9, 32) 601 for IDcell 1 is selected from among the worst sector pairs and designated as a target IDcell because it has the lowest proximity. Then, one of the sectors 9 and 32, for example, sector 9 is selected as a target sector. For generating a neighborhood matrix for swapping the sector 9 with another sector, two sectors (=4/2) are selected for all IDcells except for the target IDcell. Then a sector satisfying a predetermined criterion such as reduction of the lowest proximity for the target IDcell is detected and swapped with target sector 9.

The IDcell allocation apparatus repeats the above operation a predetermined number of times, thus swapping IDcells. Elements marked in black are changed elements from previous allocation matrices as the IDcell allocation is iterated.

As is apparent from the above description, the IDcell allocation apparatus and method for a broadband wireless communication system according to the present invention allocates IDcells to sectors so as to minimize the performance degradation of sub carrier randomization caused by reuse of IDcells. Also, IDcells can be allocated fast with good performance.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for allocating IDcells in a wireless communication system, the method comprising:
    performing, by an initial allocator, an initial IDcell allocation by allocating entire sectors to elements of an N×M IDcell matrix;
    selecting, by a target sector decider, a sector pair with a highest proximity for each IDcell in the initial allocation, determining an IDcell with a sector pair having a highest proximity of the selected sector pairs as a target IDcell, and selecting one sector of the sector pair with the highest proximity for the target IDcell as a target sector; and
    selecting, by a neighborhood set configurer, a predetermined number of sectors for each of the other IDcells, except for the target IDcell, from among sectors to which the each of the other IDcells is allocated, and swapping the IDcell of the target sector with the IDcell of a sector satisfying a first condition among the selected sectors.

2. The method of claim 1, wherein one of N and M is one of a number of IDcell parameters and a maximum number of sectors to which the same IDcell can be allocated in the system.

3. The method of claim 2, wherein the maximum number of sectors to which the same IDcell can be allocated in the system is 1.5 times larger than a value obtained by dividing the total number of the sectors by the number of IDcell parameters.

4. The method of claim 2, wherein the predetermined number is one-half of the maximum number of sectors to which the same IDcell can be allocated in the system.

5. The method of claim 1, wherein each element has a unique number of a sector allocated an ID cell in the N×M matrix.

6. The method of claim 1, wherein the sector satisfying the first condition is a best sector among sectors according to $$\text{target}\Delta < 0 \ \& \ \text{corresponding}\Delta \leq 0$$

where target Δ is a variation resulting from swapping-in the highest proximity of all sector pairs with the target IDcell, and corresponding Δ is a variation resulting from swapping-in the highest proximity of all sector pairs with an IDcell that includes an elements swappable with the target sector.

7. The method of claim 6, wherein the best sector is a sector with the least target Δ.

8. The method of claim 1, further comprising, if there is no sector satisfying the first condition among the selected sectors, swapping the IDcell of the target sector with the IDcell of a sector satisfying a second condition.

9. The method of claim 8, wherein the sector satisfying the second condition is a best sector among sectors according to $$\text{target}\Delta + \text{corresponding}\Delta \leq 0$$

where target Δ is a variation resulting from the swapping-in of the highest of the proximities of all sector pairs with the target IDcell, and corresponding Δ is a variation resulting from the swapping-in of the highest of the proximities of all sector pairs with an IDcell that includes an elements swappable with the target sector.

10. The method of claim 9, wherein the best sector is a sector with the least targetΔ+correspondingΔ.

11. The method of claim 1, further comprising:
    storing the initial allocation as a good allocation;
    calculating an objective equation for an allocation resulting the swapping and the good allocation; and updating the good allocation by comparing objective equation values of the allocation resulting from the swapping and the good allocation.

12. The method of claim 11, wherein the objective equation minimizes the highest of the proximities of sector pairs to which the same IDcell is allocated and is expressed as $$\min\left[\max_i(\text{prox\_iw}_i + \text{prox\_w}_i i)\right]$$

where $w_i$ denotes a sector with the highest proximity to sector i among sectors using the same IDcell with sector i, when frame numbers are synchronized, and denotes a sector with the highest proximity to sector i among sectors using the same (IDcell, segment number) combination with sector i, when frame numbers are not synchronized, and wherein the good allocation updating comprises updating the good allocation to an allocation with the lowest objective equation values.

13. The method of claim 1, wherein if a sector pair (a, b) includes a sector a and a sector b, the proximity of the sector pair (a, b) is the sum of interference that the sector a causes to the sector b and interference that the sector b causes to the sector a.

14. An apparatus for allocating IDcells in a wireless communication system, the apparatus comprising:
an initial allocator for performing an initial IDcell allocation by allocating entire sectors to elements of an N×M IDcell matrix;
a target sector decider for selecting a sector pair with a highest proximity for each IDcell in the initial allocation, determining an IDcell with a sector pair having a highest proximity of the selected sector pairs as a target IDcell, and selecting one sector of the sector pair with the highest proximity for the target IDcell as a target sector;
a neighborhood set configurer for forming a neighborhood set by selecting a predetermined number of sectors for each of the other IDcells except for the target IDcell from among sectors to which the each of the other IDcells is allocated;
a best neighborhood decider for determining a sector satisfying a first condition among the selected sectors as a best neighborhood; and
a termination condition monitor for swapping the IDcell of the target sector with the IDcell of the best neighborhood.

15. The apparatus of claim 14, wherein one of N and M is one of a number of IDcell parameters and a maximum number of sectors to which the same IDcell can be allocated in the system.

16. The apparatus of claim 15, wherein the maximum number of sectors to which the same IDcell can be allocated in the system is 1.5 times larger than a value obtained by dividing the total number of the sectors by the number of IDcell parameters.

17. The apparatus of claim 15, wherein the predetermined number is one-half of the maximum number of sectors to which the same IDcell can be allocated in the system.

18. The apparatus of claim 14, wherein each element has a unique number of a sector allocated an ID cell in the N×M matrix.

19. The apparatus of claim 14, wherein the sector satisfying the first condition is a best sector among sectors according to targetΔ<0 & correspondingΔ≦0 where target Δ is a variation resulting from the swapping in the highest of the proximities of all sector pairs with the target IDcell, and corresponding Δ is a variation resulting from the swapping in the highest of the proximities of all sector pairs with an IDcell that includes an elements swappable with the target sector.

20. The apparatus of claim 19, wherein the best sector is a sector with the least targetΔ.

21. The apparatus of claim 14, wherein if there is no sector satisfying the first condition among the selected sectors, the best neighborhood decider determines a sector satisfying a second condition as the best neighborhood.

22. The apparatus of claim 21, wherein the sector satisfying the second condition is a best sector among sectors according to targetΔ+correspondingΔ≦0 where target Δ is a variation resulting from swapping in the highest of the proximities of all sector pairs with the target IDcell, and corresponding Δ is a variation resulting from swapping in the highest of the proximities of all sector pairs with an IDcell that includes an elements swappable with the target sector.

23. The apparatus of claim 14, wherein if a sector pair (a, b) includes a sector "a" and a sector "b", a proximity of the sector pair (a, b) is a sum of interference that the sector "a" causes to the sector "b" and interference that the sector "b" causes to the sector "a".

24. The apparatus of claim 14, wherein the termination condition monitor stores the initial allocation as a good allocation, calculates an objective equation for an allocation resulting the swapping and the good allocation, and updates the good allocation by comparing objective equation values of the allocation resulting from the swapping and the good allocation.

25. The apparatus of claim 24, wherein the objective equation minimizes the highest of the proximities of sector pairs to which the same IDcell is allocated and is expressed as $$\min\left[\max_i(\text{prox\_iw}_i + \text{prox\_w}_i i)\right]$$

where $w_i$, when frame numbers are synchronized, denotes a sector with the highest proximity to sector i among sectors using the same IDcell with sector i and, when frame numbers are not synchronized, denotes a sector with the highest proximity to sector among sectors using the same (IDcell, segment number) combination with sector i, when frame numbers are not synchronized, and wherein the termination condition monitor updates the good allocation to an allocation with the smaller between the objective equation values.

* * * * *